(12) United States Patent
Fabbri

(10) Patent No.: US 10,336,544 B2
(45) Date of Patent: Jul. 2, 2019

(54) SYSTEM AND METHOD FOR STORING WATER IN AN UNDERGROUND RESERVOIR AND MANAGING THE SAME

(71) Applicant: Jeffrey S. Fabbri, Bakersfield, CA (US)

(72) Inventor: Jeffrey S. Fabbri, Bakersfield, CA (US)

(73) Assignee: Next Tier Agribusiness, LLC, Bakersfield, CA (US)

( * ) Notice: Subject to any disclaimer, the term of this patent is extended or adjusted under 35 U.S.C. 154(b) by 0 days.

(21) Appl. No.: 15/705,195

(22) Filed: Sep. 14, 2017

(65) Prior Publication Data

US 2019/0077603 A1     Mar. 14, 2019

(51) Int. Cl.
*B65G 5/00* (2006.01)
*E03F 1/00* (2006.01)
*E03B 11/14* (2006.01)

(52) U.S. Cl.
CPC .............. *B65G 5/005* (2013.01); *E03B 11/14* (2013.01); *E03F 1/002* (2013.01)

(58) Field of Classification Search
CPC ........... B65G 5/005; B65G 5/00; E03B 11/14; E03B 3/06; E03F 1/002; E21B 43/00
See application file for complete search history.

(56) References Cited

U.S. PATENT DOCUMENTS

| | | | |
|---|---|---|---|
| 4,180,348 A | 12/1979 | Taylor | |
| 4,669,536 A | 6/1987 | Ames et al. | |
| 5,228,802 A | 7/1993 | Kuwabara et al. | |
| 6,357,969 B1 | 3/2002 | Wheeler, Jr. et al. | |
| 6,840,710 B2 | 1/2005 | Peters et al. | |
| 7,042,234 B2 | 5/2006 | Buss | |
| 7,192,218 B2 | 3/2007 | Peters et al. | |
| 7,493,954 B2 | 2/2009 | Heller et al. | |
| 7,967,989 B2 | 6/2011 | Gong et al. | |
| 8,074,670 B2 | 12/2011 | Peters et al. | |
| 8,337,121 B2 | 12/2012 | Poerio et al. | |
| 9,146,206 B2 | 9/2015 | Rhodes et al. | |
| 9,278,808 B1 | 3/2016 | McIntyre et al. | |
| 9,371,185 B2 | 6/2016 | Gu et al. | |
| 9,689,235 B1 | 6/2017 | Ayotte | |
| 2005/0173124 A1* | 8/2005 | McDonald | B01D 5/0081 166/369 |

* cited by examiner

*Primary Examiner* — Carib A Oquendo

(74) *Attorney, Agent, or Firm* — James M. Duncan, Esq.; Klein DeNatale Goldner

(57) ABSTRACT

A water storage and management system takes water from a water source, such as captured run-off, and through a piping system, directs a flow of the water into an aquifer for storage and future utilization. Using moisture detectors, the system ascertains the water content of different layers or zones of the aquifer and reports this information to a digital processor. The digital processor may utilize this information to issue instructions to one or more control valves to direct the flow of the water into portions of the aquifer which have additional storage capacity. The digital processor may also instruct a submersible pump to withdraw from the aquifer as desired.

26 Claims, 3 Drawing Sheets

SYSTEM AND METHOD FOR STORING WATER IN AN UNDERGROUND RESERVOIR AND MANAGING THE SAME

BACKGROUND OF THE INVENTION

The present invention relates to underground storage of water and more specifically to a system and method which directs water to underground storage zones having available storage capacity. The presently disclosed system and method further may be directed toward water storage in land where the land surface is utilized for other purposes, such as for agricultural use, thereby making efficient use of the land by allowing the concurrent use of the surface and subsurface.

Underground water storage reservoirs provide an alternative to storage of water in open reservoirs. Underground water storage reservoirs, i.e., aquifers, will have one or more porous and permeable layers. Porosity and permeability are the aquifer properties which, respectively, refer to the pore volume available for water storage and the hydraulic conductivity of the aquifer. For utilization for underground water storage, an underground zone must have available pore space and water must be able to flow through the zone to be recovered for utilization for irrigation or other use.

In some regions, water is allowed to accumulate in holding ponds and filter downward into underground storage reservoirs. However, this method of storage has several disadvantages. For example, this method requires the dedication of a land surface area for the holding pond. As another disadvantage, this method results in the loss of water through evaporation as the water slowly filters through the surface soil into the underground storage zones. As another disadvantage, it can be difficult to ascertain where the water has gone and whether the underground storage zones are approaching capacity.

Some underground water storage facilities address water loss through by evaporation by introducing the water into the underground reservoir by piping systems rather than simply allowing the water to enter the underground storage zones by filtration. This type of system expedites introduction of the water into the aquifer and thereby reduces evaporation losses. However, depending upon the design of the water storage facility, the underground reservoir may still require the dedication of significant areas of real property. Moreover, such systems do not, without additional control mechanisms or structure, identify the particular zones or depth into which the water is introduced. Identifying the zones or depth into which the water is introduced can be a significant issue if the underground water storage facility is beneath a land surface utilized for agricultural purposes because saturation of the root-zone can be detrimental to the health of a crop.

SUMMARY OF THE INVENTION

In contrast to other known underground water storage systems, embodiments of the present invention introduce water into specific underground zones, monitor the moisture levels in different underground zones, and actively prevent the oversaturation of upper soil layers and the root-zone of a crop by suspending water flow into the upper soil layers if the moisture content in the crop-zone approaches an undesirable threshold. In addition, embodiments of the present invention may control the underground zones into which water is introduced and may maintain a record of the water volumes introduced into specific zones. Finally, embodiments of the present invention may further incorporate subsurface pumps which can remove water from a particular zone for either use or for redirecting to a different location in the aquifer.

An embodiment of the presently disclosed system comprises a water source typically, but not necessarily, located at a ground surface elevation. The water source may comprise either a surface storage facility or a surface water collection facility which collects water runoff and delivers the water, through a piping system, to an aquifer which is typically at an elevation below the elevation of the water source. The aquifer has one or more layers, where each layer has a particular porosity for storing water and a particular permeability, which is the characteristic of the layer which allows water to flow through the interstices of the layer. The piping system has an inlet proximal to the water source for receiving a flow of the water. The piping system has an outlet proximal to one or more layers of the aquifer. A moisture detector is disposed in the one or more layers. The moisture detector ascertains the moisture content of a particular layer and transmits a signal to a digital processor which monitors the observed moisture content. The system may have another moisture detector set in a different layer which ascertains the moisture content of the different layer and transmits a signal corresponding to the observed moisture content to the digital processor so that the digital processor may compare the observed moisture content of one layer with respect to a second layer.

For aquifers having a first porous and permeable layer overlying a second porous and permeable layer, a multi-sensor device may be utilized to ascertain the moisture contents of the first and second layers. The multi-sensor device essentially has multiple moisture sensors contained within a single housing, where the housing spans between the first and second layers.

The piping system may have an actuated control valve which controls flow of water from the surface storage facility into the aquifer. The actuated control valve may be connected to the digital processor and instructed to adjust to a variety of different positions based upon the moisture content observed in various layers of the aquifer. For aquifers which are underlying a surface crop, an actuated control valve may be instructed by a digital processor to stop flow of water into the aquifer if excessive moisture is detected adjacent to the root-zone near the soil surface.

DETAILED DESCRIPTION OF THE INVENTION

Figure 1:
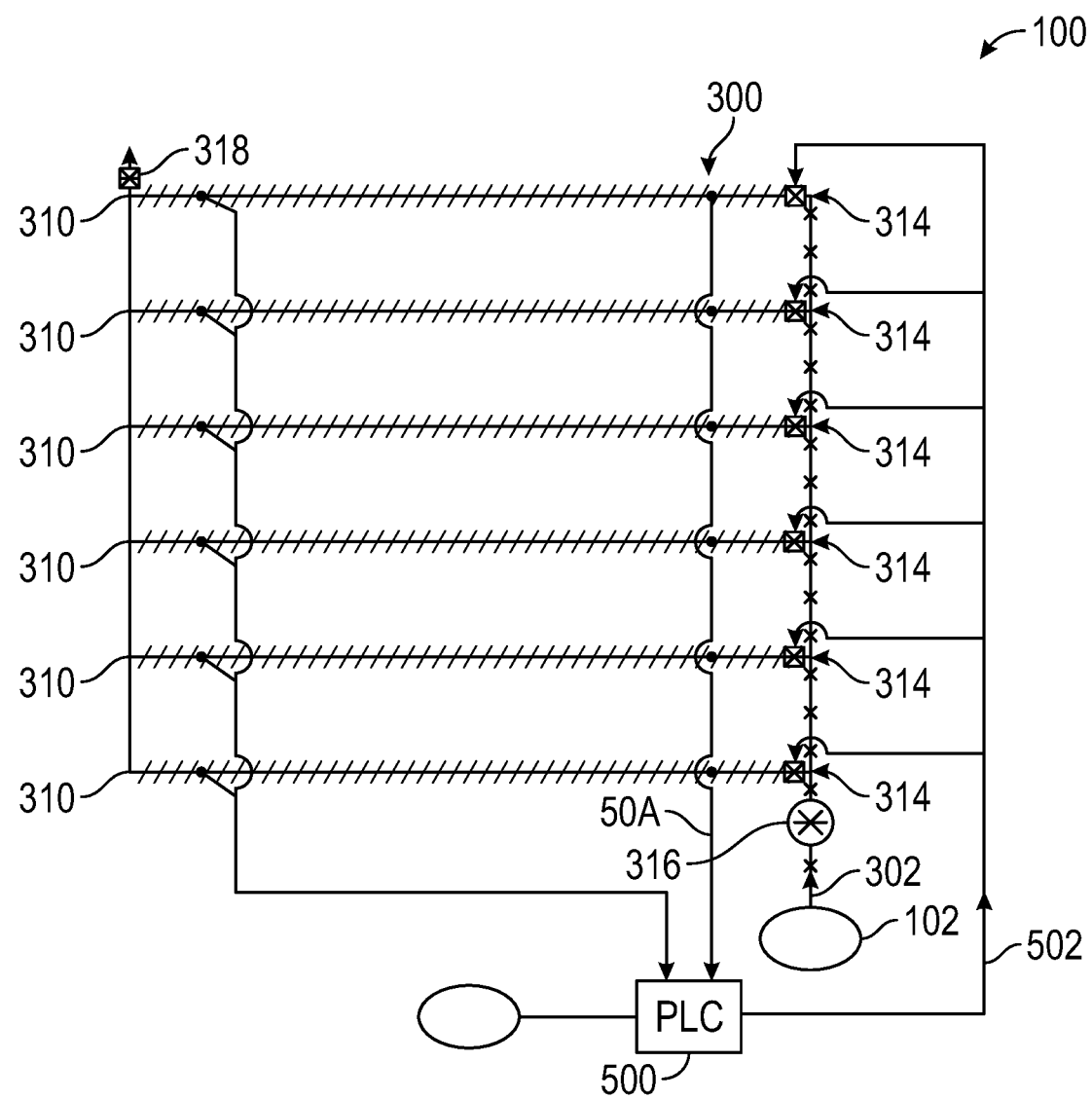
FIG. 1 schematically depicts an embodiment of the disclosed system.

Referring now to the figures, FIG. 1 schematically depicts an embodiment of the disclosed system for delivering and storing water 100 (the "water system"). The water system 100 includes a water supply 102. Water supply 102 may be either a surface containment structure, such as a tank, holding pond, catch basin, etc. Alternatively, water supply 102 may be a flowing water source including a pipe, culvert, or drain pipe. It is to be appreciated that embodiments of the water system 100 may utilize a variety of different forms of water supply 102, including local or remote water wells. These forms of water supply may include structures which capture water which would otherwise be lost to sewers and storm drains. For example, the water supply 102 may capture runoff from roofs and roads through gutters and French drains.

Figure 2:
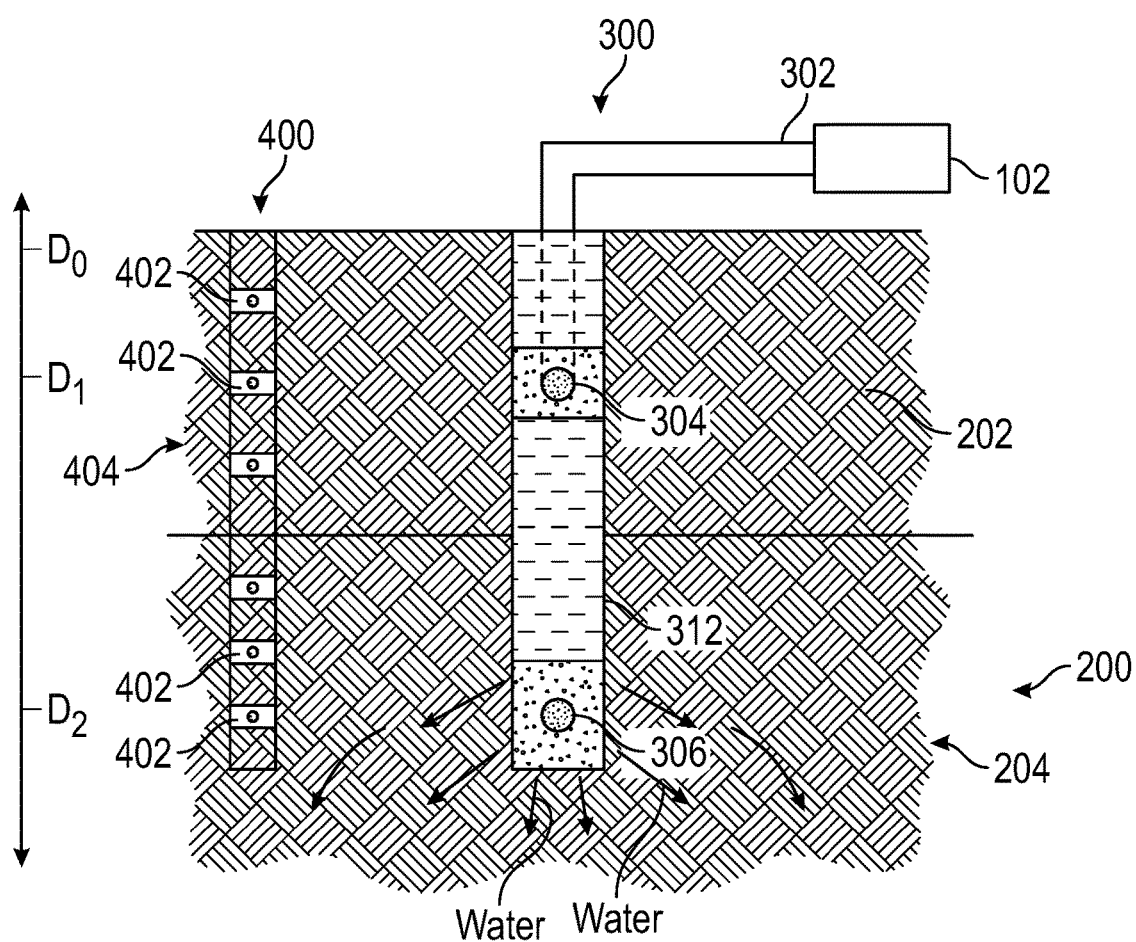
FIG. 2 is an elevational view of an outlet of a piping system for discharging water into a porous and permeable layer.
Figure 3:
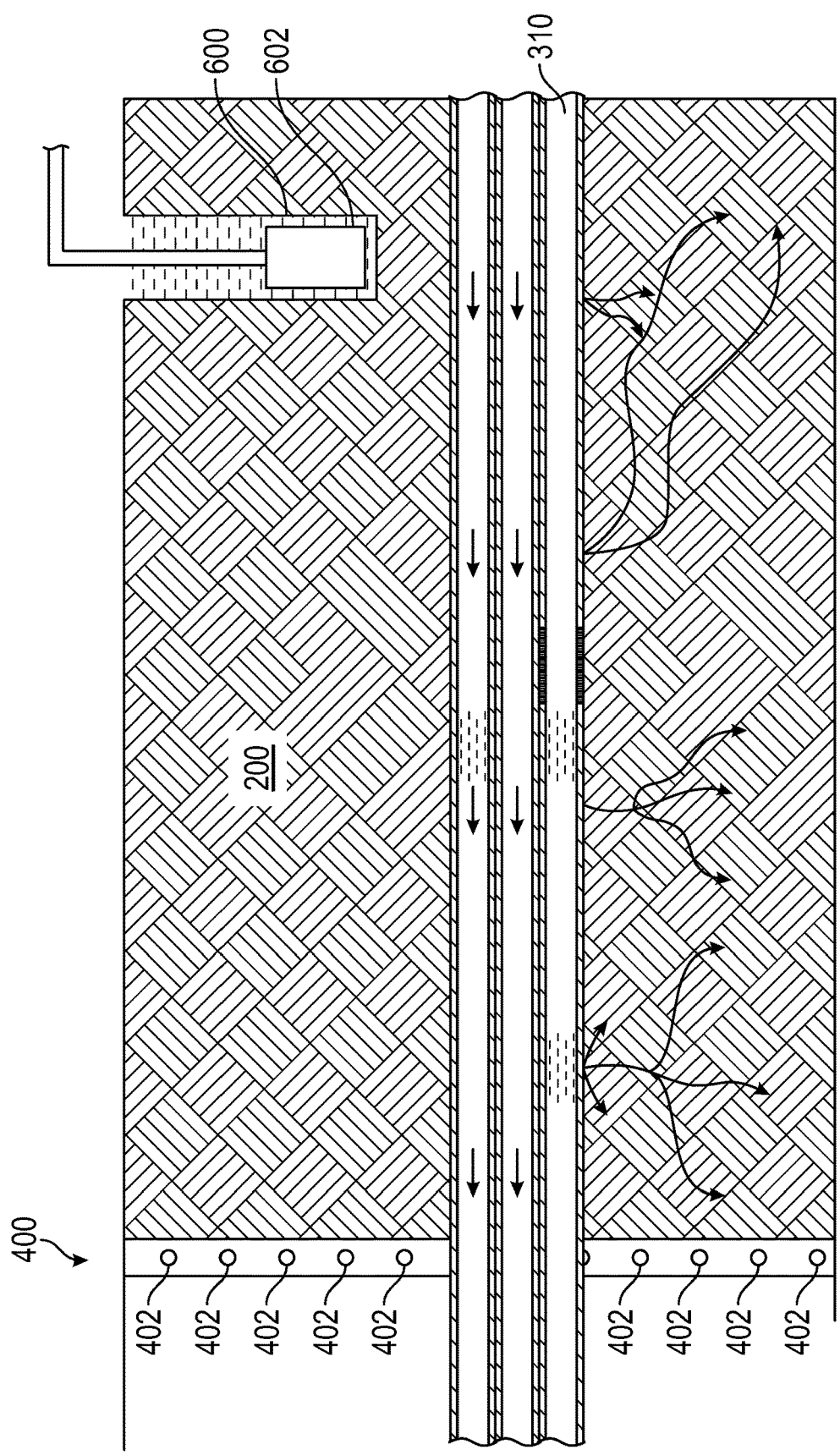
FIG. 3 is a cross-sectional view of a segment of the disclosed system.

The water system 100 comprises an aquifer 200, such as that schematically shown in FIG. 2. Aquifer 200 may comprise multiple layers which may include a first porous and permeable layer 202 ("first layer") which has a general depth (or elevation) of $D_1$. First layer 202 will have generalized properties of porosity and permeability which will impact the water storage capacity of the first layer as well as the ability of water to flow through the layer vertically and laterally. Aquifer 200 may also have a second porous and permeable layer 204 ("second layer") which has a general depth of $D_2$. The second depth may be deeper than the first depth, but the first depth could be deeper, or the depths of the two layers could be approximately the same in case of laterally adjacent layers.

The generalized properties of porosity and permeability of second porous and permeable layer 204 may be approximately the same as those for first layer 202, or the generalized properties may be different, which means a difference between the water storage capacity of the of the second layer 204 and the first layer 202, and the ability of water to flow through the layers. These differences mean that the second layer 204 may have less or more capacity to store water than the first layer 202. As discussed below, these differences in water storage capacity demonstrate the desirability of separately ascertaining the moisture content of each layer.

Water system 100 includes a piping system 300 which conveys water from water supply 102 and distributes the water to various points within the aquifer 200, placing the water supply 102 in hydraulic communication with the aquifer 200. Piping system 300 may have an inlet 302 proximally located to the water supply 102. Inlet 302 will be set at an elevation $D_0$ which may, but not necessarily, be the approximate ground elevation. Elevation $D_0$ is typically at a higher elevation relative to the depths of the first layer 202 and second layer 204 to allow gravitational flow. However, in some circumstances, such as where the water supply 102 is a water well, $D_0$ may be below the depths of first layer 102 and second layer 204. Piping system 300 delivers water to an outlet 304 disposed within first layer 202. Likewise, piping system 300 may deliver water to an outlet 306 disposed within second layer 204. Although only two layers 202, 204 are shown in FIG. 2, it is to be appreciated that embodiments of the water system 100 have comprise an aquifer having many more layers and may have one or more outlets disposed within each layer.

Water system 100 further comprises a moisture detector 400. Moisture detector may have multiple sensors 402 in a single housing 404. Sensors 402 may be disposed at different depths such that moisture content for a particular layer 202, 204 or at different depths within an individual layer may be ascertained and monitored. Each sensor 402 within moisture detector 400 may generate an output signal associated with a moisture observed at a particular time and depth. The moisture detector 400 transmits the output signal to a digital processor 500 located at the surface.

Moisture detector 400 may be of the capacitive type which uses metallic rings as the plates of a capacitive element. The multiple sensors 402 of moisture detector are located at various depths for a particular layer and provide a profile of the soil moisture of the layer. Such moisture detectors are described, among other references, in U.S. Pat. No. 7,042,234 to Buss and U.S. Pat. No. 9,146,206 to Rhodes et al. and available through several sources including SENTEK. Embodiments of the invention may also utilize neutron probe type devices for measuring moisture, or hybrid devices which employ the technology of both capacitive and neutron probe devices.

As indicated in the figures, a section of land overlying an aquifer 200 may have a piping system 300 which provides a conduit for transmission of water from water supply 102 to a variety of outlets disposed within the aquifer. Piping system 300 may have a plurality of generally horizontal segments 310 which deliver water to the areal extent of the aquifer 200. Piping system 300 may also have a plurality of generally vertical segments 312 which deliver water to particular depths of the aquifer. Horizontal segments 310 and vertical segments 312 may form an intersecting matrix which is capable of delivering water to the lateral and depth limits of the aquifer 200.

Horizontal segments 310 and vertical segments 312 may be made up of segments of perforated pipe which are set within gravel in either trenches or holes. Alternatively, the horizontal segments 310 and vertical segments 312 may have a plurality of discrete outlets for release of water at particular lateral locations and or depths within the aquifer 200.

As suggested by FIG. 1, an embodiment of the presently disclosed water system 100 may provide automated management of a water storage aquifer 200. Water from water supply 102 is provided either by pump (not shown) or by gravitation into piping system 300. Piping system 300 has one or more flow control valves 314 which are instructed by digital processor 500 to open, close, decrease flow or increase flow with the instructions provided by a control signal provided through either hard-wire connection 502 or by wireless transmission. Upon the opening of one or more control valves 314, water flows from water supply 102 into piping system 300. A water flow meter 316 may provide observed water flow rates to digital processor 500, which may have a volume totalizing algorithm which monitors total water volume delivered to aquifer 200 over a given period of time. Piping system may further have a flush valve 318 to expedite draining or cleaning the piping system.

As indicated by FIG. 1, a plurality of flow control valves 314 may be utilized to control water flow into various segments or layers of the aquifer. It is to be appreciated that while FIG. 1 appears as a plan view of a piping system, the piping segments connected to the flow control valves 314 may be horizontal segments 310 and/or vertical segments 312. The outlets 304 of a vertical segment 312 may be discrete, as opposed to a slotted pipe segment, such that separate layers of a vertical section of the aquifer 200 may be independently recharged with water. The moisture content of a particular layer may be observed with moisture detector 400 and reported back to digital processor 500 by wire connection 504 or wireless transmission. Upon receipt of this data a determination made by the digital processor whether additional water may be introduced into that particular layer or, conversely, water flow should be suspended and/or water withdrawn from that particular layer.

Using FIG. 2 by way of example, moisture sensors 402 may report to digital processor 500 that the lower portion of first layer 202 is full is not taking additional water and the moisture level near the surface is increasing. If the surface is used for agricultural purposes, the moisture content may be monitored near the rootzone to prevent undesirably high moisture levels near the rootzone. Upon receipt of this data, the digital processor 500 may instruct a first flow control valve 314 to stop or reduce water flow to first layer 202. The digital processor 500 may likewise instruct a second flow control valve 314 to increase water flow to second layer 204. The digital processor 500 may also start an electric submersible pump 602 set within a subsurface water well 600 to pump down the water in the aquifer 200.

The above described system may be utilized for water storage management, where data is provided to a digital processor 500 of the storage capacity and moisture content of an aquifer 200. Upon receipt of this data, through the utilization of the piping system 300, flow control valves 314, moisture detectors 400 and other devices, the digital processor 500 may be utilized to direct the flow of water into discrete portions of the aquifer and/or to withdraw water from portions of the aquifer which have no available storage capacity.

Having thus described the preferred embodiment of the invention, what is claimed as new and desired to be protected by Letters Patent includes the following:

1. A system for delivering and storing water comprising:
  a water source located at a base elevation;
  an aquifer comprising a first porous and permeable layer located at a first elevation, the aquifer further comprising a second porous and permeable layer located at a second elevation;
  an upper zone overlying, and in fluid communication with, the first porous and permeable layer;
  a piping system having a first inlet proximal the water source and a first outlet proximal the first elevation and a second outlet proximal the second elevation, the piping system placing the water source in hydraulic communication with the aquifer;
  a soil moisture detector disposed in the upper zone, the soil moisture detector sensing a moisture in the upper zone and generating an output signal associated with the moisture;
  a digital processor which receives the output signal from the soil moisture detector, wherein the digital processor is configured to compare the output signal from the soil moisture detector to a predetermined moisture value; and
  an actuated valve disposed between the water source and the aquifer, wherein the actuated valve is in electronic communication with said digital processor and configured to selectively increase or restrict flow of water from the water source into the aquifer,
  wherein when the moisture detected in the upper zone is greater than the predetermined moisture value, the digital processor sends a signal to the actuated valve causing the actuated valve to restrict flow of water into the aquifer, and further wherein when the moisture detected in the upper zone is less than the predetermined moisture value, the digital processor sends a signal to the actuated valve causing the actuated valve to increase flow of water into the aquifer.

2. The system of claim 1 wherein the actuated valve is communicatively connected to the digital processor, wherein the actuated valve adjusts the flow of water to a flow rate specified by the digital processor which flow rate is in the range of flow rates extending from the no-flow condition to the full-open flow condition.

3. The system of claim 2 further comprising a flow meter in the piping system, wherein the flow meter generates an output transmission associated with an observed flow rate and transmits said observed output transmission to the digital processor.

4. The system of claim 1 wherein the base elevation is above the first elevation and the second elevation.

5. The system according to claim 1, wherein the soil moisture detector is a first soil moisture detector sensing a first soil moisture and generating a first output signal associated with the first soil moisture, the system further comprising:
  a second soil moisture detector moisture detector disposed in the first porous and permeable layer, the second soil moisture detector sensing a second soil moisture in the first porous and permeable layer and generating a second output signal associated with the second moisture; and
  a third soil moisture detector disposed in the second porous and permeable layer, the third soil moisture detector sensing a third moisture in the second porous and permeable layer and generating a third output signal associated with the third moisture.

6. A system for delivering and storing water comprising:
  a water source located at a base elevation;
  an aquifer comprising a first porous and permeable section and an adjacent second porous and permeable section, the first porous and permeable section and the second porous and permeable section located at a first elevation;
  an upper zone overlying, and in fluid communication with, one or both of said first porous and permeable section and said second permeable section;
  a piping system having a first inlet proximal the water source and a first outlet proximal the first elevation, the piping system placing thew water source in hydraulic communication with the aquifer;
  a soil moisture detector disposed in the upper zone, the soil moisture detector sensing a moisture in the upper zone and generating an output signal associated with the moisture;
  a digital processor which receives the output signal, wherein the digital processor is configured to compare the output signal to a predetermined moisture value; and
  an actuated valve disposed between the water source and the aquifer, wherein the actuated valve is in electronic communication with said digital processor and configured to selectively increase or restrict flow of water from said water source into said aquifer,
  wherein when the moisture detected in the upper zone is greater than the predetermined moisture value, the digital processor sends a signal to the actuated valve causing the actuated valve to increase flow of water into the aquifer, and further wherein when the moisture detected in the upper zone is less than the predetermined moisture value, the digital processor sends a signal to the actuated valve causing the actuated valve to restrict flow of water into the aquifer.

7. The system of claim 6 wherein the first outlet is disposed within the first porous and permeable section.

8. The system of claim 7 further comprising a second outlet disposed within the second porous and permeable section.

9. The system of claim 6 wherein the actuated valve is a first actuated valve, and wherein the first actuated valve adjusts the flow of water to a first flow rate specified by the digital processor for flow into the first porous and permeable section, the system further comprising:
  a second actuated valve communicatively connected to the digital processor wherein the second actuated valve adjusts flow of water to a second flow rate specified by the digital processor for flow into the second porous and permeable section.

10. The system of claim 9 further comprising a first flow meter in the piping system, wherein the first flow meter generates a first output transmission associated with a first observed flow rate through the actuated valve and transmits said first observed output transmission to the digital processor.

11. The system of claim 10 further comprising a second flow meter in the piping system, wherein the second flow meter generates a second output transmission associated with the second observed flow rate through the second actuated valve and transmits said second observed output transmission to the digital processor.

12. The system according to claim 6, wherein the soil moisture detector is a first soil moisture detector sensing a first soil moisture and generating a first output signal, the system further comprising:
  a second soil moisture detector disposed in the first porous and permeable section, the second soul moisture detector sensing a second moisture in the first porous and permeable section and generating a second output signal associated with the second moisture; and
  a third soil moisture detector disposed in the second porous and permeable section, the third soil moisture detector sensing a third moisture in the second porous and permeable section and generating a third output signal associated with the third moisture.

13. A system for delivering and storing water comprising:
  a water source located at a base elevation;
  an aquifer comprising a first porous and permeable section located at a first elevation and a second porous and permeable section located at a second elevation;
  an upper zone overlying, and in fluid communication with, the first porous and permeable layer;
  a piping system having a first inlet proximal the water source and a first outlet proximal the first elevation and a second outlet proximal the second elevation, the piping system placing the water source in hydraulic communication with the aquifer;
  a first soil moisture detector disposed in the first porous and permeable section, the first soil moisture detector sensing a first moisture in the first porous and permeable section and generating a first output signal associated with the first moisture;
  a second soil moisture detector disposed in the second porous and permeable section, the second soil moisture detector sensing a second moisture in the second porous and permeable section and generating a second output signal associated with the second moisture;
  a third soil moisture detector disposed in the upper zone, the third soil moisture detector sensing a third moisture in the upper zone and generating a third output signal associated with the third moisture; and
  a digital processor which receives the first output signal, and the second output signal, and the third output signal.

14. The system of claim 13 wherein the piping system comprises a first actuated valve which controls flow of water between the water source and the first outlet from a range of flow rates from a no-flow condition to a full-open flow condition.

15. The system of claim 13 wherein the piping system comprises a second actuated valve which controls flow of water between the water source and the second outlet from a range of flow rates from a no-flow condition to a full-open flow condition.

16. The system of claim 15 further comprising a first flow meter in the piping system, wherein the first flow meter generates a first output transmission associated with a first observed flow rate through the first outlet and transmits said first observed output transmission to the digital processor.

17. The system of claim 16 further comprising a second flow meter in the piping system, wherein the second flow meter generates a second output transmission associated with a second observed flow rate through the second outlet and transmits said second observed output transmission to the digital processor.

18. The system of claim 13 wherein the aquifer comprises a subsurface pump activatable by the digital processor.

19. The system according to claim 13, wherein the piping system is configured to restrict flow of water to the first porous and permeable layer when the third moisture exceeds a predetermined value.

20. A method for storing water in an aquifer underlying a surface crop and root zone comprising the steps of:
  gathering a volume of water into a surface collection system at an upper elevation;
  causing the volume of water to be directed into a piping system wherein the volume of water enters an inlet hydraulically connected to the surface collection system and a first portion of the volume of water exits the piping system through a first outlet into a first porous and permeable layer of the aquifer located at a first elevation below the upper elevation; and
  ascertaining a first moisture content in the first porous and permeable layer with a first moisture detector which emits a first output signal associated with the first moisture content and transmits the first output signal to a digital processor, wherein the digital processor instructs an actuated valve to close if flow of the volume of water into the root zone is detected.

21. The method of claim 20 wherein a second portion of the volume of water exits the piping system through a second outlet into a second porous and permeable layer located at a second elevation below the upper elevation.

22. The method of claim 21 comprising the further step of ascertaining a second moisture content in the second porous and permeable layer with a second moisture detector which emits a second output signal associated with the second moisture content and transmits the second output signal to the digital processor.

23. The method of claim 20 where the piping system comprises an actuated valve which controls flow of the volume of water between the surface collection system and the first outlet from a range of flow rates from a no-flow condition to a full-open flow condition.

24. The method of claim 23 wherein the actuated valve is communicatively connected to the digital processor, wherein the actuated valve adjusts the flow of water to a flow rate specified by the digital processor which flow rate is in the range of flow rates extending from the no-flow condition to the full-open flow condition.

25. The method of claim 20 wherein the aquifer comprises a subsurface pump activatable by the digital processor.

26. The method of claim 25 comprising the further step of instructing the subsurface pump to activate to remove water from the root-zone.

* * * * *